United States Patent
Muir et al.

(10) Patent No.: US 9,002,745 B2
(45) Date of Patent: Apr. 7, 2015

(54) SECURE MEDIA DISTRIBUTION IN A WAGER GAMING SYSTEM

(75) Inventors: David Muir, Newcastle (AU); Binh Nguyen, Reno, NV (US); Brian Underdahl, VC Highlands, NV (US)

(73) Assignee: IGT, Las Vegas, NV (US)

( * ) Notice: Subject to any disclaimer, the term of this patent is extended or adjusted under 35 U.S.C. 154(b) by 2328 days.

(21) Appl. No.: 11/644,229

(22) Filed: Dec. 21, 2006

(65) Prior Publication Data
US 2008/0153588 A1    Jun. 26, 2008

(51) Int. Cl.
G06F 21/00    (2013.01)
G06F 21/10    (2013.01)
G07F 17/32    (2006.01)

(52) U.S. Cl.
CPC ........ *G06F 21/10* (2013.01); *G06F 2221/2109* (2013.01); *G07F 17/32* (2013.01)

(58) Field of Classification Search
USPC .............................................. 463/42; 705/59
See application file for complete search history.

(56) References Cited

U.S. PATENT DOCUMENTS

| | | | |
|---|---|---|---|
| 6,546,374 | B1 | 4/2003 | Esposito et al. |
| 6,754,346 | B2 | 6/2004 | Eiserling et al. |
| 2002/0002674 | A1 | 1/2002 | Grimes et al. |
| 2002/0112171 | A1* | 8/2002 | Ginter et al. .................. 713/185 |
| 2003/0134675 | A1* | 7/2003 | Oberberger ..................... 463/29 |
| 2003/0182574 | A1 | 9/2003 | Whitten et al. |
| 2004/0003271 | A1 | 1/2004 | Bourne et al. |
| 2004/0213408 | A1 | 10/2004 | Kim |
| 2005/0086478 | A1 | 4/2005 | Peinado et al. |

(Continued)

FOREIGN PATENT DOCUMENTS

| | | |
|---|---|---|
| EP | 1626327 A1 | 2/2006 |
| WO | 2008/079635 | 7/2008 |

OTHER PUBLICATIONS

International Search Report dated Jun. 27, 2008 for related PCT application No. PCT/US2007/086761.

(Continued)

*Primary Examiner* — Tsan-Yu J Huang
(74) *Attorney, Agent, or Firm* — Neal, Gerber & Eisenberg LLP

(57) ABSTRACT

Novel wager gaming systems, machines, and methods for ensuring that wager game code on a game disc executes on an authorized wager gaming machine are described. To prevent an unauthorized copy of a wager game disc or other storage medium is not able to execute on a gaming machine, the machine checks whether an authorization code has been previously written to the disc. If the disc does not have a code, the gaming machine generates a first segment of an authorization code which is used, along with other data, by a game provider to generate a final authorization code. This is done after the game provider verifies that the machine operator has permission, such as a license, to execute that game code contained on that specific disc. The final authorization code is transmitted to the gaming machine, equipped with a writeable optical disc drive, where it is written or "burned" onto the game disc. At this stage the game disc is tied to or associated with the gaming machine and can execute on that machine.

12 Claims, 8 Drawing Sheets

(56) References Cited

U.S. PATENT DOCUMENTS

| | | |
|---|---|---|
| 2005/0192099 A1* | 9/2005 | Nguyen et al. .................. 463/42 |
| 2005/0278716 A1 | 12/2005 | Koppen et al. |
| 2006/0026604 A1 | 2/2006 | Tan et al. |
| 2006/0036552 A1 | 2/2006 | Gunyakti et al. |
| 2006/0059571 A1 | 3/2006 | Chen et al. |
| 2006/0217202 A1* | 9/2006 | Burke et al. .................... 463/42 |

OTHER PUBLICATIONS

International Preliminary Report on Patentability dated Jun. 23, 2009, from Application No. PCT/US2007/086761.

* cited by examiner

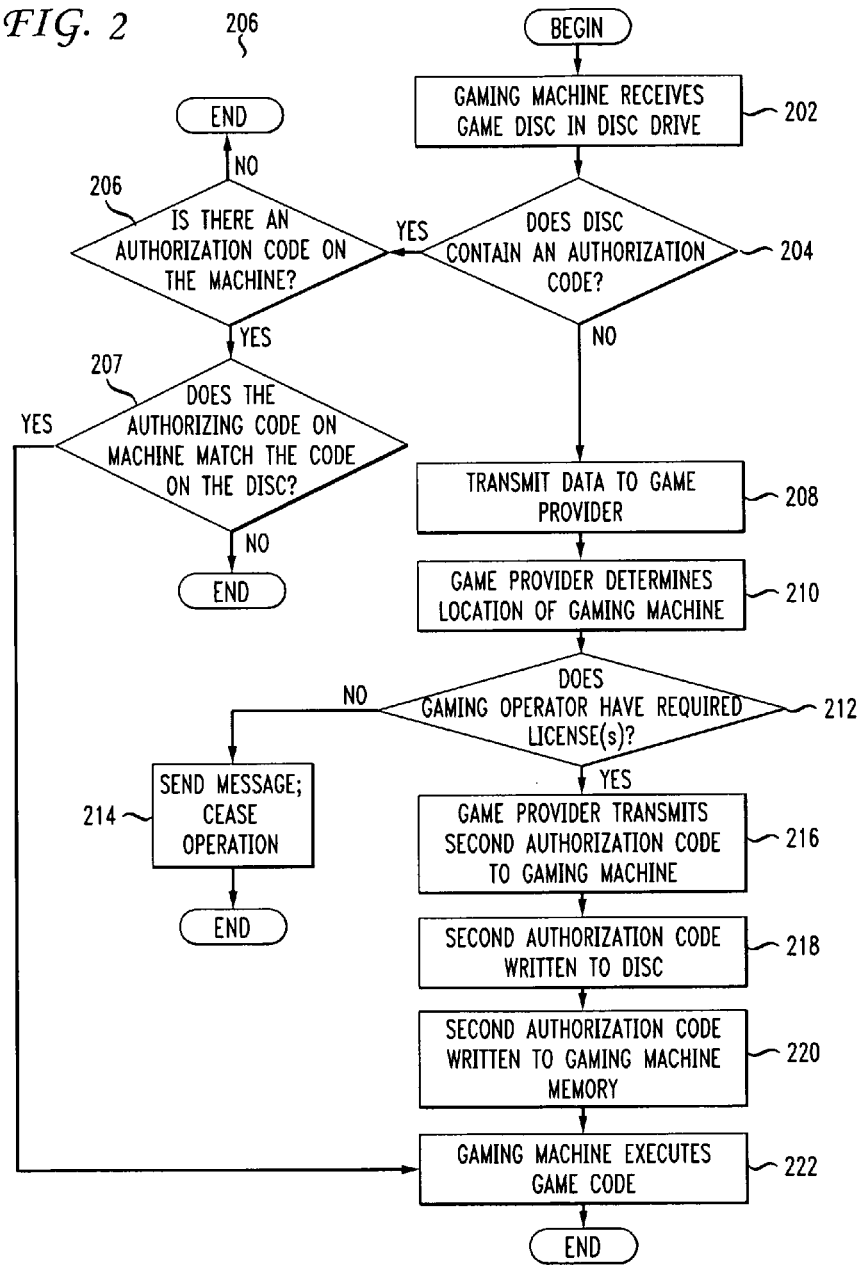

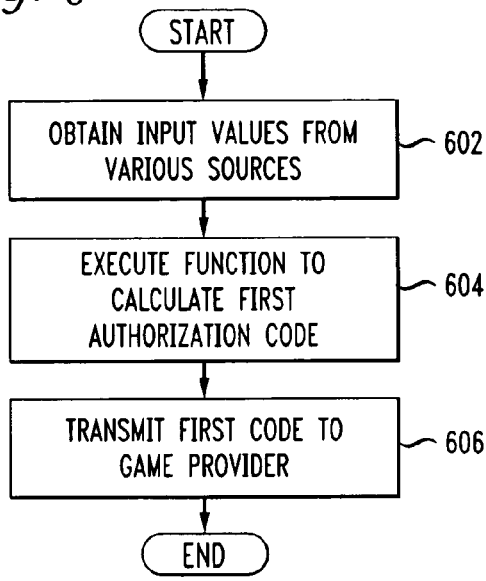
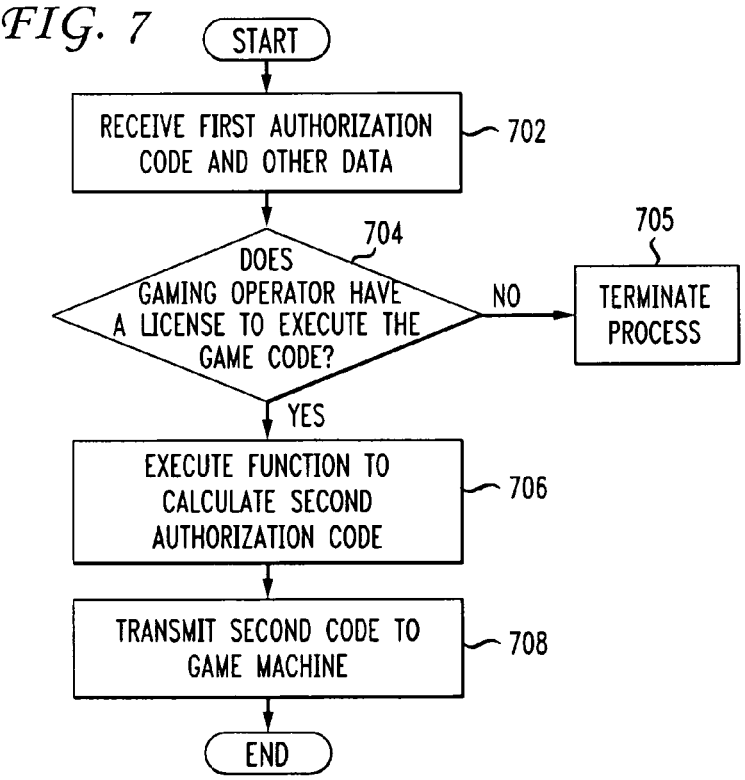

SECURE MEDIA DISTRIBUTION IN A WAGER GAMING SYSTEM

BACKGROUND OF THE INVENTION

1. Field of the Invention

The present invention relates generally to preventing execution of unauthorized copies of software stored on a storage medium. More specifically, it relates to preventing the use of unauthorized, copied wager gaming software in a gaming network.

2. Description of the Related Art

Presently, a common process of distributing wager gaming software to electronic gaming machines involves inserting a game disc, such as a DVD, into the machine and loading the game code onto the machine's RAM as needed to execute the game. A game disc typically contains all the code and logic necessary for the wager game to execute and be played on the gaming machine. Game discs for a specific game are often identical to one another. There are no data on one game disc that distinguishes it from another game disc for the same game. In cases where there is, for example, an unique identifier on a game disc, the identifier has not been used generally to prevent loading and execution of the game code on the disc onto multiple machines. That is, any such identifier or unique stamp may be copied 'bit by bit' without affecting use of a copied game disc in another gaming machine.

Many modern gaming machines are assembled with optical disc drives that are typically located in a protected or secured area of the machine and capable of reading data. Some machines also have a secure identity chip storing a unique serial number identifying the gaming machine. A game disc is inserted into a machine's optical disc drive (typically located in a protected or secured area of the machine) by the gaming operator. Once inserted, the loading and execution process that occurs thereafter is typically automated, generally not requiring that any further steps be taken by the gaming operator.

Presently, an entity or individual in possession of a wager game disc can mass create copies of the disc using an optical disc recorder or "burner," such as those commonly used to copy music CDs and DVDs. Each of the copied discs can be inserted into a gaming machine having the appropriate hardware and be played on the gaming machine. As noted above, even if the original disc has a unique identifier on it, the identifier is simply recorded or duplicated on each of the copies, undistinguishable from the game code and not hindering the use and execution of the copied discs on other gaming machines. Thus, a game developer providing a finished product game disc to a casino has little control over the subsequent use and proliferation of copies of the original game disc. The original game disc is typically provided to the casino under a license to implement the game on the disc on a specified number of gaming machines. Given that copied versions of the game disc will execute on gaming machines with the requisite hardware, the unscrupulous casino or gaming operator can run an unlimited number of unauthorized or unlicensed copies of the game disc without the game provider's knowledge or approval.

SUMMARY OF THE INVENTION

Novel wager gaming systems and methods are described for preventing unauthorized copies of wagering game software contained on a storage medium from executing on gaming machines. Wagering game software is often stored on an optical disc, such as a DVD. These discs or other storage media can be copied by a user, such as a licensee or purchaser, and used on multiple gaming machines or other computing devices having an optical disc drive. The wagering game software provider stores the wager game code on storage media for distribution to gaming operators. In the case where the storage media is an optical disc, the game provider may use a rewriteable optical disc having, for example, a DVD-RW, DVD+RW, or DVD-RAM format. The game provider stores a unique disc ID on the disc along with the game code. Once a gaming operator receives the game discs and inserts the game discs into gaming machines, the unique game disc ID and other data may be used to integrally connect the game disc with a gaming machine. This tying together of the game disc with the gaming machine has two primary features: 1) it enables execution of the game code embodied in the game disc on that gaming machine; and 2) it prevents the game code on the game disc from being executed on other gaming machines. Thus, illicit, unlicensed, or otherwise unauthorized copies of a game disc will not execute on a gaming machine.

Upon inserting the game disc into a gaming machine disc drive, the drive searches for an authorization code on the disc. If there is one on the disc, it is compared to an authorization code stored in a secured area of non-volatile memory on the gaming machine. If there is no authorization code on the disc, the gaming machine generates a first or initial authorization code using a secured function on the gaming machine. The function, which implements an algorithm developed by the game disc provider, may accept as input the game disc ID, a gaming machine ID, data relating to the gaming operator, among other data. The function generates a first authorization code which may be unique to the game disc and the gaming machine. The code is communicated in some manner to the game provider. Other data, such as game machine serial number or ID, gaming operator ID, location, and so on, may be communicated as well. Often, the communication or transmission will be over a network, such as the Internet, and be automatic and transparent to the operator. In another embodiment, only the inputs may be transmitted to the game provider who generates the first authorization code.

Once the game provider receives or generates the first authorization code, it uses the code and other data to generate a final authorization code using an authorization function different from the one on the gaming machine. The function accepts as input the first authorization code and may accept various other data as input such as sales order data, licensing data, and the like. For example, the game provider determines whether the game machine or gaming operator has a license to execute the game disc on the specific gaming machine. The game provider may also determine the location of the gaming machine to ensure that wager game execution complies with gaming regulations. If all the data are verified, the final authorization code is generated and transmitted to the gaming machine. The gaming machine may then write or "burn" the final authorization code to the disc. In one embodiment, the gaming machine has a writeable disk drive and the game disc is a writeable disc. The gaming machine may also save the final authorization code to its secured non-volatile memory. At this stage the gaming machine and the game disc are integrally tied or coupled to one another. The game disc having been given what can be described as a "birth certificate" in that it now has a code that has been recorded to it, thereby inherently associating it with a particular gaming machine. The game disc will only execute on that gaming machine (and any others that have the required final authorization code corresponding to the game disc).

One aspect of the invention is a wager gaming machine having a storage medium accessing-component, such as an optical disc drive, capable of operating on removable storage medium. The machine also has a non-volatile memory area for storing a first authorization code and a final authorization code. Also stored on the machine is an authorization code-generating module and an authorization code search module. In one embodiment, the optical disc drive is a writeable disc drive. In another embodiment the authorization code-generating module implements an authorization code function that accepts as an input a unique removable storage medium identifier, such as a unique game disc identifier stored on the medium by a game provider. The function may also accept as input other data relating to the wager gaming machine and to the gaming operator.

Another aspect of the present invention is a method of distributing software created by a software provider to a user. The software is stored by the provider on a storage medium. The provider also stores a storage medium unique identifier on the medium. The storage medium containing the software and the identifier provided to a software user for execution on a device. Upon insertion of the storage medium in the device, a first authorization code is generated and transmitted to the software provider. The provider generates a second or final authorization code based at least in part on the first authorization code. The second authorization code is transmitted to the device thereby enabling the device to execute the software on the storage medium.

In one embodiment, the device writes or records the second authorization code to the storage medium and stores the code in a non-volatile memory on the device. In other embodiments, in addition to receiving the first authorization code, the provider also receives device-related data and/or storage medium-related data. In some embodiments, these data are used together with the first authorization code to generate the second or final authorization code using a final authorization code function. In some embodiments, the provider uses the first authorization code and other data it receives from the user to determine whether the user is authorized or has a license to use the software generally and/or on the specific device. In some embodiments the storage medium is an optical disc to which data can be written or recorded, the device is a wager gaming machine, and the software is wager gaming software.

Another aspect of the invention is a method of executing wager gaming software stored on storage medium. A gaming machine determines whether a final authorization code has been written to the storage medium. The machine generates a first authorization code using storage medium data. The first authorization code is transmitted to a wager game provider. The machine receives the final authorization code from the wager game provider and writes the final code to the storage medium, thereby enabling execution of the wager gaming software on a gaming machine.

In one embodiment, the first authorization code is generated using a first authorization code function that uses gaming machine data, specifically a storage medium unique identifier. In another embodiment, gaming machine data and gaming operator data are also transmitted or communicated to the wager game provider. In another embodiment, the final code is written to the storage medium utilizing a writeable disc drive, wherein the final authorization code is recorded to an optical disc. In another embodiment the final authorization code is generated by the wager game provider based at least in part on the first authorization code generated on the gaming machine.

Another embodiment of the present invention is a wager gaming network having one or more servers under the control of a game provider, the servers implementing a memory area for storing a final authorization code function and multiple unique storage medium identifiers, and a gaming machine equipped with a writeable storage medium component, such as a DVD burner, and a non-volatile memory area for storing a first or initial authorization code function and a first authorization code. In one embodiment, the wager gaming network utilizes a TCP/IP-network connection between the gaming machine and the one or more game provider servers, where one or more of the servers may be licensing servers. In another embodiment the memory area under control of the game provider also stores multiple first authorization codes.

Another aspect of the present invention is a method of associating a storage medium with a device intended to operate on data contained on the storage medium. A computing component receives a first or initial code, the first code being derived from storage medium data and device data. In one embodiment, this set of data includes the first code. The component verifies the first set of data to ensure that the device is authorized to operate on the data, such as computer instructions, contained on the storage medium. The component generates a second code and transmits it to the device wherein the second code is written to the storage medium using a memory device capable of writing data to the storage medium. In one embodiment, the storage medium is a rewriteable optical disc and the memory device is a DVD burner. In another embodiment, the storage medium is flash memory and the memory device is a flash memory controller.

The present invention provides hardware (such as gaming machines, optical disc drives, servers, network devices and so on) that is configured to perform the methods of the invention, as well as software to control devices to perform these and other methods.

These and other features of the present invention will be presented in more detail in the following detailed description of the invention and the associated figures.

BRIEF DESCRIPTION OF THE DRAWINGS

References are made to the accompanying drawings, which form a part of the description and in which are shown, by way of illustration, specific embodiments of the present invention:

FIG. 2 is a flow diagram of a process of initiating execution of wager game software on a gaming machine in accordance with one embodiment of the present invention.

FIG. 6 is a flow diagram of a process for generating a first authorization code in accordance with one embodiment of the present invention.

FIG. 7 is a flow diagram showing a process for generating the second authorization code in accordance with one embodiment of the present invention.

DETAILED DESCRIPTION OF THE INVENTION

Figure 1:
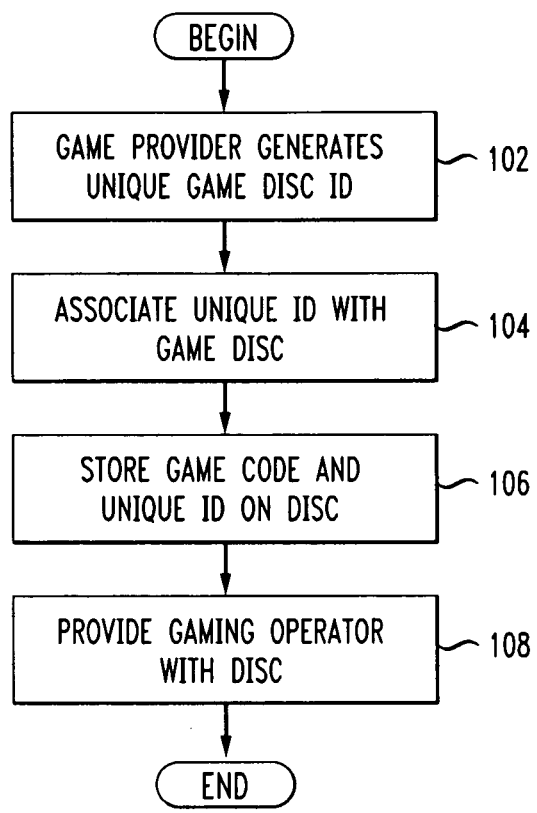
FIG. 1 is a flow diagram of a process of creating a wager game disc that contains wager game code and of distributing the discs to gaming operators in accordance with one embodiment of the present invention.

Exemplary applications of systems, machines, and methods according to the present invention are described. These examples are provided solely to add context and aid in the understanding of the invention. Thus, it will be apparent to one skilled in the art that the present invention may be practiced without some or all of the specific details described herein. In other instances, well-known process steps, system components, and software and network concepts have not been described in detail in order to avoid unnecessarily obscuring the present invention. Other applications are possible, such that the following examples, illustrations, and contexts should not be taken as definitive or limiting either in scope or setting. Although these embodiments are described in sufficient detail to enable one skilled in the art to practice the invention, these examples, illustrations, and contexts are not limiting, and other embodiments may be used and changes may be made without departing from the spirit and scope of the invention.

For example, although the present invention is directed primarily to electronic gaming machines and storage media, it is worth noting that some of the systems and methods disclosed herein might be adaptable for use in other contexts and environments, such that their use is not restricted exclusively to the wager gaming context. In fact, it will be readily appreciated that a wide variety of software applications stored on various media can be securely distributing using the inventive systems and methods disclosed herein. Such other software and media may include PC software applications, network applications, creative content, and so on, as well as any other software or data that can be duplicated may benefit from the inventive software and hardware architectures disclosed and detailed herein. Such other adaptations may become readily apparent upon review of the following detailed description. Although such other applications can be used with the inventive systems and methods disclosed herein, for purposes of clarity the discussion here shall focus on examples involving actual wager gaming machines and game discs.

Methods and systems for distributing gaming software from a game provider to a gaming operator that reduce the risk of the software being copied and used on multiple electronic gaming machines are described in the various figures. The described embodiment is of wager gaming software created and stored on an optical storage medium, specifically a DVD that can be re-written ("recorded") to, and implemented on an electronic gaming machine having an optical disc drive. In one example, a wager game provider creates wager gaming software that is stored on a DVD and licensed to a casino. The casino may have a license with the game provider to install the wager game software on 50 gaming machines. The casino receives 50 copies of the DVD, and each is inserted in the disc drive of each of the 50 machines. However, an unscrupulous gaming operator may copy or "burn" any number of copies from any one of the discs it receives from the game provider and install and execute the copied, unauthorized discs on other gaming machines. In the described embodiment the process begins with the game provider creating wager gaming software and storing it on a storage medium for shipment or transmission to a gaming operator, such as a casino.

FIG. 1 is a flow diagram of a process of creating a wager game disc that contains wager game code and of distributing the discs to gaming operators in accordance with one embodiment of the present invention. Steps of the method shown and described herein need not be performed (and in some implementations are not performed) in the order indicated. Some implementations of this method may include more or fewer steps than those described. At step 102 a game provider (an entity that creates and licenses wager gaming software) generates a unique game disc identifier. In one embodiment, the game disc identifier may be an alphanumeric sequence unique to the specific game disc. If the game provider knows which gaming operator will receive the disc associated with the identifier, the alphanumeric sequence may have an indicia of the gaming operator.

At step 104 the unique disc identifier is written to and stored on the game storage medium. As noted above, in the described embodiment, the game storage medium is a DVD. In other preferred embodiments, other storage media can be used including a range of optical disc types. For example, the media may include: digital and fluorescent multilayer discs, mini-discs, digital video express discs, GD-ROM discs, universal media discs, phase-change dual discs, Blu-ray discs, HD-DVDs, enhanced versatile discs, ultra density optical discs, versatile multilayer discs, and protein-coated discs.

In other preferred embodiments, other types of storage media are used as USB storage devices, US keys, magnetic storage, EEPROMs, flash memory devices, and various removable storage media to which data can be recorded or written to subsequent to the initial writing or storing of data. Depending on the medium used, the wager gaming machine, described below in FIG. 9, will need the appropriate hardware to read and, in the described embodiment, record to the medium. Thus, optical discs, such as DVDs, are used only to illustrate the described embodiment but is not intended to limit applications of the present invention. The methods and systems described herein may be applied to other types of storage media, such as those described above as well as others.

Figure 5:
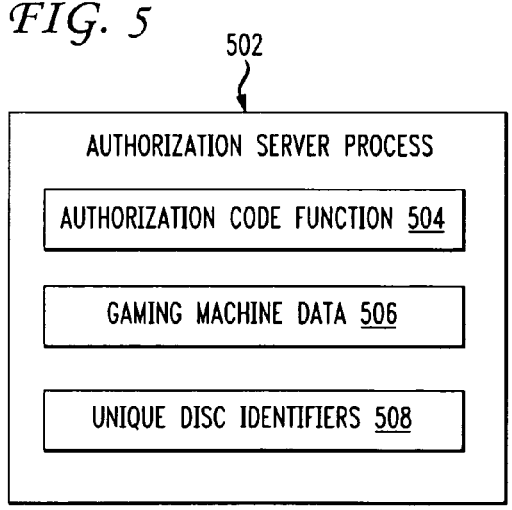
FIG. 5 is a block diagram showing software and data stored at a game provider in one embodiment of the present invention.

In other embodiments, an identifier is assigned to and associated with the disc but is not recorded to the disc. In these embodiments, the game provider ensures that the unique identifier can be associated with the disc so that the relationship or coupling can be used in processes described below. For example, associate a game provider creates 30 discs of the same game for a gaming operator. Each disc is assigned a unique identifier and saved by the game provider. The game provider can, for example, associate disc number 18 with its assigned unique ID (e.g., "85A25UR") which is stored by the game provider as shown in FIG. 5.

At step 106 wager game code is stored on a disc. Wager game code may be in the form of a binary file or "image" executable on the appropriate hardware platform. In the described embodiment, the binary game image (and other components such as a linker, linker map file, compiler, and so on) and the unique disc identifier are recorded onto the disc. In other embodiments, additional data items can be written to the disc. At step 108 the game provider supplies a gaming operator, such as a casino, with copies of the wager game in the form of multiple DVDs, according to one or more license agreements between the game provider and the operator. In one example, if a gaming operator has a license to install and execute the game on 30 gaming machines, the game provider sends the gaming operator 30 discs, each storing a unique identifier and the same game code. As noted above, in some embodiments the unique identifier may not be stored on the disc or storage medium. Instead, the identifier is associated with a game disc and the association is stored by the game provider. In the described embodiment, the identifier is not evident from examining the disc or storage medium and may not be known to the gaming operator. In addition, a region code may be stored on the disc, wherein a region is, for example, a country, state, gaming jurisdiction, and so on. Thus, a game storage medium having a region code corresponding to Macau will not be operable in a gaming machine in the United States or any region outside of Macao. As described below, other information such as sales records and licensing data may also be associated with the unique ID. In another embodiment, the gaming operator may be informed of the unique identifier or a portion of it. Once a gaming operator receives the game disc, it can proceed to implementing the game code by inserting the disc into a gaming machine or appropriate server in a gaming network.

FIG. 2 is a flow diagram of a process of initiating execution of wager game software on a gaming machine in accordance with one embodiment of the present invention. Steps of the method shown and described herein need not be performed (and in some implementations are not performed) in the order indicated. Some implementations of this method may include more or fewer steps than those described. At step 202 a game disc, produced following the process of FIG. 1, is inserted into an optical disc drive of a gaming machine at a gaming establishment, such as a casino, under control of a gaming operator. Most gaming machines have optical disc drives thereby making them capable of reading a DVD. For example, the Advanced Video Platform (AVP) gaming machine made by IGT of Reno, Nev. has an optical disc drive. It is worth noting that IGT is also a game provider. In one embodiment, the optical disc is only recordable or writeable, often referred to as DVD-R and DVD+R since data are written to the disc without having to re-write over what is already on the disc. In another embodiment, the optical disc drive can also re-write or record data to a DVD after the DVD has been previously written to. In this described embodiment, the DVD is "ReWritable," and referred to as DVD-RW, DVD+RW, or DVD-RAM. They use a phase-changing recording layer that can be repeatedly changed and restored by a laser diode. This may require that the appropriate software for recording data on a disc be on the machine. Data are recorded to a DVD in a "recording session" which is finalized when all the desired data has been written to the disc. In other embodiments, such software may not be needed and the optical disc drive may be capable of re-writing data to the disc without external software applications. In other embodiments, gaming machines may have the hardware components and software for reading from and writing to other types of removable storage media, such as flash memory, USB keys, and the like. In one embodiment, the gaming machine has a LightScribe-enabled drive. LightScribe is a technology that encompasses a special type of disc drive that etches or marks data onto a special LightScribe disc. The data are readable by a LightScribe drive and by a human being by examining the surface of the disc where the data appear as a label. Further information on LightScribe is available on the Internet at lightscribe.com.

At step 204 the gaming machine determines whether an authorization code has been written on to the disc. In the described embodiment, this is done using authorization code search logic stored on the gaming machine. This logic, implemented in a search module or function, automatically searches for an authorization code when a game disc or other storage media is inserted into the machine. If one has, the disc has been associated with a gaming machine. Authorization code comparison logic, implemented in a comparison module on the gaming machine, compares the code with the code stored in non-volatile memory on the machine. At step 206 the gaming machine determines whether there is an authorization code in its memory. If there is no code on the machine, the process terminates and the game does not execute. In one embodiment, a report or message is sent to the game provider and/or gaming operator. If there is a code on the machine, at step 207, the gaming machine determines whether the authorization code on the machine matches the code on the disc. If there the codes match, the gaming machine executes the game code as shown in step 222. If the codes do not match, the process terminates and the game does not execute and a report may be transmitted to the game provider and/or gaming operator.

In the described embodiment, if the game disc does not contain an authorization code, the gaming machine transmits data about the disc to the game provider at step 208. It may also transmit data relating to the gaming operator, and the machine itself to the game provider. In the described embodiment, a first or gaming machine-generated authorization code is created using a combination of these data, for example, the disc identifier and the machine serial number of ID. This process is described in further detail below. The gaming machine authorization code is unique to the gaming machine and is created using data specific to the machine and to the disc. The function or algorithm used to generate the first authorization code is preferably pre-installed on the machine as shown in FIG. 5. The transmission may be done over a computer network such as the Internet, a VPN, or other type of network connecting the gaming operator with the game provider. Examples of such network are provided below with respect to FIG. 8 wherein the transmission to the game provider is transparent to the gaming operator. In other embodiments, these data, except for the first authorization code can be communicated to the game provider via verbal communication such as over the telephone. In another embodiment these data can be entered manually by the gaming operator via a secure game provider Web site using e-mail or other TCP/IP-based communication. Numerous other methods can be used such as fax and written correspondence. Data that are transmitted or communicated in some manner may include a disc identifier (if known to the gaming operator), a gaming operator identifier, such as a casino ID, a gaming machine serial number, date and time, sales information such as sales order number, among other data.

As noted, the first authorization code is derived using a function or algorithm previously installed and resident on the gaming machine. In other embodiments, the first authorization code is derived by the game provider when it receives some or all of the aforementioned data. This may be preferred in cases where the data are communicated to the game provider verbally, in writing, and the gaming operator does not know the unique game disc identifier. The authorization code function on the gaming machine (or at the game provider site) accepts as input one or more of the data items described above, such as a gaming operator identifier, a gaming machine serial number, a game disc identifier and the like. The function uses some or all of these data to derive the first authorization code. In one embodiment, only the first authorization code is sent. Thus, at step 208 the only data transmitted to the game provider is the authorization code. In the described embodiment, the first authorization code is hashed before being transmitted for additional security. In another embodiment, the authorization code and other data are sent. As noted earlier, in one embodiment if the gaming machine is manufactured by the game provider, the function may be programmed into the gaming machine by the game provider. In another example, a game provider may have a relationship with a gaming machine manufacturer and have the function embodied, for example in an ASIC chip on the gaming machines. In the described embodiment, the function is not known to any party other than the game provider. In another embodiment, the function is shared with gaming operator who can use it to derive the authentication code segment and transmit the code to the game provider. In another embodiment, the gaming operator may only know the inputs to the function and not the function itself. In one embodiment, the gaming operator may store a copy of the first authorization code, for example, in its non-volatile memory.

Upon receiving the data, including the first authorization code from the gaming operator, the game provider performs certain operations. At step 210 the game provider examines the data received from the gaming operator and determines the gaming machine's location as last recorded in the game provider's records. For example, often one condition of a license to use the wager game software between the game provider and gaming operator may be that the provider be informed by the gaming operator of the physical locations of the gaming machines on which the wager games will be installed. In another scenario, information on the physical location of the gaming machines may be contained in a sales order or similar document containing information on the sale of the gaming machine. The provider may have this if it sold the gaming machine to the gaming operator or may obtain it from the gaming machine manufacturer. Of course, it is possible for a gaming operator to move gaming machines to new locations and not inform the provider. In some embodiments, known methods of physically locating a machine may be used, such as GPS technology, Wi-Fi triangulation, or other forms of triangulation. As is known in the art, such techniques require that the gaming machines have certain components that may not be present in a conventional gaming machine. In embodiments where the Internet or other TCP/IP-based networks are used to transmit data to the game provider from the gaming machine (or from Web server connected to the gaming machine), commercially available software tools can be used to identify a location using TCP/IP protocols and rules.

It may be necessary for the game provider to know the location of the gaming machine on which the game will execute to ensure that the wager game is being played in a jurisdiction that allows that particular wager game. For example, a gaming jurisdiction, such as the state of Nevada in the United States or the Macau province in China, may allow wager gaming but may have restrictions on the types of wager games that can be played or on the number of gaming machines on which the particular game can be played. The game provider may take reasonable precautions to ensure compliance by the gaming operator that the game provider's software is not executed in a jurisdiction where it is prohibited. In other embodiments the gaming provider may not want to be involved in ensuring regulatory compliance by the gaming operator and may bypass the step of determining the location of the gaming machine.

At step 212 the game provider determines whether the gaming operator has a license for the wager game and for the specific game disc itself. At this stage, in the described embodiment the game provider has received data relating to the gaming operator (e.g., the specific casino or gaming establishment of the gaming operator), the machine, and the specific game disc, specifically, the game disc identifier, and the first authorization code (step 208). In one embodiment, the game provider checks for a license or whether an existing license has expired by searching a licensing database on a licensing server as described in FIG. 3. Licensing data may be arranged in numerous formats and configurations and embodied in licensing servers in various arrangements. Details of licensing servers that may be utilized in the present invention are described in U.S. patent application Ser. No. 11/225,408, titled "Method and Devices for Authentication and Licensing in a Gaming Network," by Kinsley, et al., incorporated by reference herein for all purposes. If the game provider determines that the gaming operator does not have a license for the specific game disc or for the game, it sends a message to the gaming operator stating that no license for the specific game disc or for the game is in effect and operation ceases at step 214.

If the gaming operator has a license or is otherwise authorized to install and execute the wager game code contained on the disc, the game provider sends a second (or game-provider generated) authorization code, which can also be described as the final code, to the gaming machine at step 216. In some embodiments the second authorization code is encrypted or hashed. In the described embodiment the second authorization code is calculated using a function or algorithm that accepts as input various data items, including the first authorization code sent to the provider at step 208 (or the same as described by the provider based on data from the gaming operator). In the described embodiment, this function is different from the function used to derive the first authorization code. In another embodiment, it may be the same or have similar properties. The function may use data from various sources, including the unique disc identifier and the gaming machine serial number. In this respect the second (final) authorization code establishes, in the described embodiment, a one-to-one relationship between the game disc and the gaming machine where the game disc can only execute on its associated gaming machine. Furthermore, neither the first authorization code nor the final authorization code can be easily replicated because of security measures taken to protect the two functions used to generate the codes and their inputs. In the described embodiment, the functions are under the strict control of the game provider. In some embodiments, inputs other than those described above, such as inputs unrelated to the gaming machine, disc or characteristics of the gaming operator can be used to derive the first and second authorization codes. In this manner, an entity or individual having access to the gaming operator's machines and network and who somehow obtains the function for the first authorization code, cannot reproduce the second authorization code that is sent back to the gaming machine at step 216 and needed to execute the game as described below.

At step 218 in the described embodiment the final authorization code is written or "burned" to the game disc by the gaming machine. A "recording session" is initiated where the disc is opened, written to, and finalized. As described above, this can be done to DVD-R, DVD+R, DVD-RW and DVD+RW formatted discs. In another embodiment a LightScribe formatted disc can be used, wherein data are etched or marked onto the disc using a LightScribe-enabled drive. The gaming machine identifier or serial number can also be written to the disc. As noted above, in the described embodiment the gaming machine has an optical writeable disc drive that enables recording data to a disc after the disc has already been written to. By writing the second authorization code to the disc, the disc is integrally linked with the gaming machine. In another embodiment, the code is "etched" onto the disc using LightScribe technology. In this embodiment, the gaming machine is equipped with a LightScribe disc drive. In one embodiment, the LightScribe laser can etch or mark the disc on one side while the other side is read using a normal optical disc drive. As described above, by etching the code on the disc, the code is readable by a human and by the LightScribe disc drive. In another embodiment, the code may not be readable by a human being by etching it in a manner and location on the disc that enables reading only by a LightScribe drive.

At step 220, in the described embodiment, the final authorization code is also saved to the gaming machine's memory such as non-volatile memory and is preferably stored with the first authorization code if it was stored earlier. In another embodiment, the gaming machine ID or serial number is written to the disc together with the final authorization code, which further tightens the coupling between the disc and machine. In other embodiments, the second authorization code is not recorded to the disc and is only stored in gaming machine memory. At step 222 the gaming machine executes the game software on the disc and proceeds to normal operation. It is worth noting here that the next time the gaming machine is turned on and the game disc is in the machine (or re-inserted), in the described embodiment, the machine will detect the final authorization code written to the disc and compare it to the authorization code stored in the machine's non-volatile memory. If there is a match between the two codes, it knows the disc has been certified for that machine and game code execution begins.

Figure 3A:
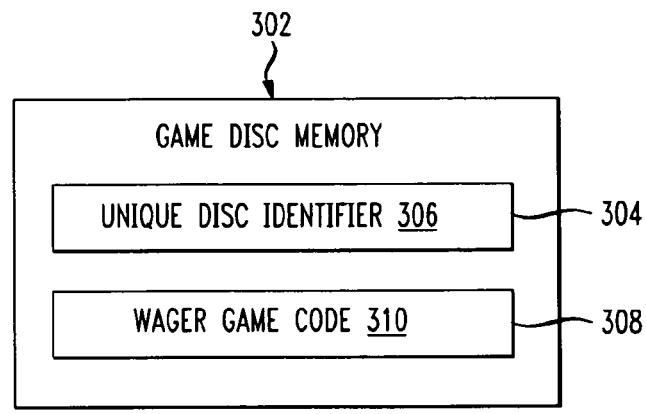
FIGS. 3A and 3B are block diagrams showing data stored on a wager game disc before and after an authorization code has been recorded to a disc in accordance with one embodiment of the present invention.
Figure 3B:
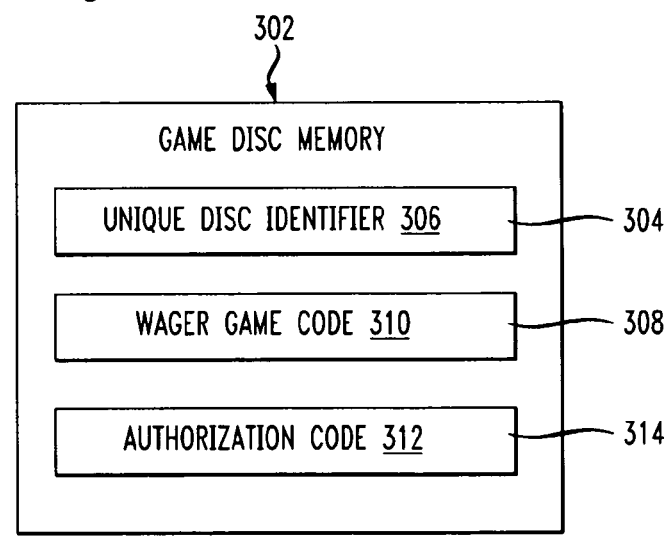

FIGS. 3A and 3B are block diagrams showing data stored on a wager game disc before and after an authorization code has been recorded to a disc in accordance with one embodiment of the present invention. Referring to FIG. 3A, a game disc memory 302 contains a first memory area 304 for storing a unique game disc identifier 306. In the described embodiment, unique identifier 306 is recorded to the disc by the game provider. Also stored on disc memory 302 in second memory area 308 is wager game code 310, for example, in the form of a binary image. In other embodiments other data, such as linkers, linker map files, and so on, may be stored in game disc memory 302. FIG. 3B shows a game disc memory 312 after an authorization code is written to the disc and has been operatively linked to a gaming machine (not shown). Game disc memory 302 contains the same unique disc identifier 306 in memory area 304 and wager game code 310 in memory area 308. In the described embodiment, disc memory 302 now contains final authorization code 312 in a third memory area 314. Other data items, such as a gaming machine identifier are also stored in memory 302. In other embodiments, other storage media can be used to store the data items described above.

Figure 4:
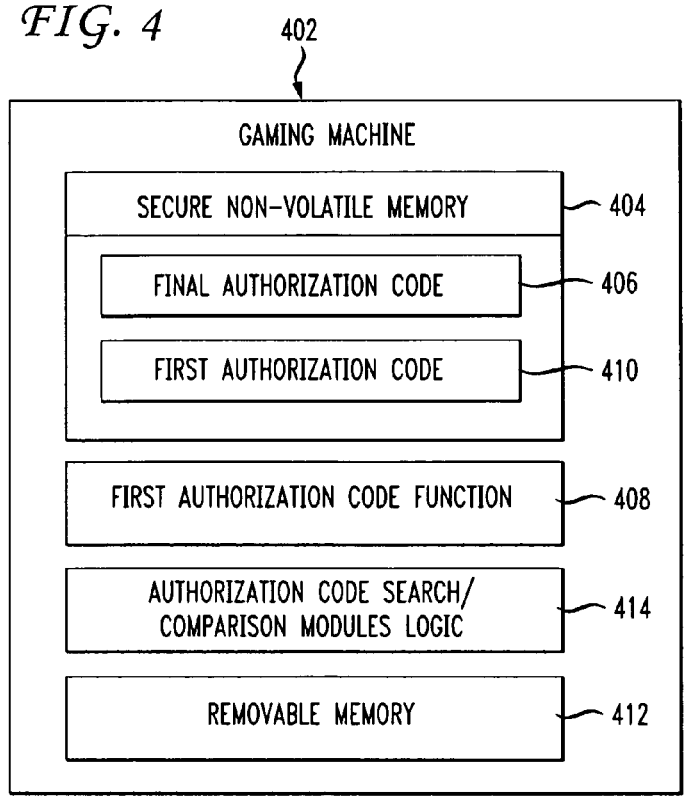
FIG. 4 is a block diagram showing relevant components and modules of a gaming machine for implementing one embodiment of the present invention.

FIG. 4 is a block diagram showing relevant components and modules of a gaming machine for implementing one embodiment of the present invention. A wager gaming machine 402 has a secure non-volatile memory area 404, typically a secured area in ROM or other type of persistent memory. In the described embodiment, a second authentication code 406 written to memory 404 after receiving it from the game provider. In another embodiment, it may also store the first authorization code 410 after it has been derived by the gaming machine or by the game provider. A function 408 is shown for calculating first authorization code 410 in secure memory 404 or other storage area. Also shown is a removable memory component 412. In the described embodiment removable memory component 412 is an optical disc drive capable of writing data to a DVD or other optical disc (a disc "burner"). In another embodiment, removable memory component 412 is a flash drive or other portable drive. In another embodiment, memory component 412 is a LightScribe disc drive. In the described embodiment, gaming machine 402 may also contain module 414 that is capable of searching for an authorization code on a game disc and comparing a code with a code stored on the gaming machine.

FIG. 5 is a block diagram showing software and data stored at a game provider in one embodiment of the present invention. In the described embodiment these data and software reside or execute under the control of an authorization server process 502. In the described embodiment, server process 502 is implemented in one or more license servers (not shown). For example, process 502 may execute on license server 817 or on one or more of the servers shown in FIG. 8. Server process 502 executes an authorization code function 504 for calculating the second authorization code once gaming machine data 506 and unique disc identifiers 508 are verified. In the described embodiment authentication server process 502 is implemented at a game provider site or under control of the game provider.

In the described embodiment, authorization server process 502 is implemented on one or more licensing servers under control of a game provider. In some embodiments, there may be multiple licensing servers at the game provider's site and some or all of the processes and data described in the various embodiments of the present invention may reside on multiple licensing servers. In some embodiments, the gaming operator may have a remote licensing server or host with a controller provided by the game provider. In some embodiments, the licensing server at the gaming operator implements some or all of the authorization server processes and functions described above.

FIG. 6 is a flow diagram of a process for generating a first authorization code in accordance with one embodiment of the present invention. Steps of the method shown and described herein need not be performed (and in some implementations are not performed) in the order indicated. Some implementations of this method may include more or fewer steps than those described. It further describes step 208 of FIG. 2. At step 602 the gaming machine obtains the inputs for the function that calculates the first authorization code. In the described embodiment, these inputs may include a gaming operator ID, a casino or game establishment ID, the gaming machine serial number or other unique identifier, the unique game disc identifier, and other data that characterize or identify the gaming operator, machine, disc, and the like. At step 604, a function implementing an algorithm created by the game provider executes upon receiving the input. In the described embodiment, the function executes on the gaming machine. In another embodiment, it executes on another component in a gaming network under control of the gaming operator, such as a server computer or another gaming machine. In another embodiment, it executes on a component at a game provider site or under the control of the game provider, such as a remote licensing server in the gaming operator network.

At step 606, if the first authorization code is generated at the gaming machine or on a component in the gaming operator's network, it is transmitted to the game provider. As described earlier, this may be done automatically and transparently over the Internet or other network or via non-transparent means such as e-mail, telephone, and the like. At this stage the process of deriving and transmitting the first authorization code is complete.

FIG. 7 is a flow diagram showing a process for generating the second authorization code in accordance with one embodiment of the present invention. Steps of the method shown and described herein need not be performed (and in some implementations are not performed) in the order indicated. Some implementations of this method may include more or fewer steps than those described. At step 702 the game provider receives the first authorization code and other data from the gaming operator or it generating the code itself based on data it receives from the gaming machine. The other data may include some or all of the data used to generate the first code and/or additional data from the machine, gaming operator, or from its own data repositories. In the described embodiment, these data include data on "sale" or license of the disc to the gaming operator that the game provider had previously stored.

At step 704 the game provider determines whether the gaming operator has a license to execute the game software on the disc. It does so by examining license data relating to that gaming operator maintained by the game provider. If there is a license, at step 706 a function implementing an algorithm developed by the game provider executes to generate the final authorization code. In the described embodiment this function is kept secure and secret by the game provider. If the gaming operator does not have a license or any other form of authorization to execute the game code, the process terminates at step 705. At step 708 the final authorization code is transmitted to the gaming machine. In the described embodiment, this is done over a network such as the Internet or by other means as noted below. In other embodiment, other data may also be transmitted to the gaming machine or to the gaming operator, such as a date/time stamp, licensing information and so on. At this stage the process of creating and transmitting the final code to the gaming machine is complete.

As noted above, although the described embodiments provided above use optical discs as the storage medium to illustrate the present invention, other types of storage media can be used equally as well, such as USB storage devices, US keys, magnetic storage, EEPROMs, flash memory devices, and various removable storage media to which data can be recorded or written to subsequent to the initial writing or storing of data. Depending on the medium used, the wager gaming machine, described below in FIG. 9, will need the appropriate hardware to read and, in the described embodiment, record to the medium. As described below, the wager gaming machine contains an optical disc drive. In other embodiments, it may contain a flash memory capability, means for reading and writing to magnetic media, and so on. Thus, optical discs, such as DVDs, are used only to illustrate the described embodiment but is not intended to limit applications of the present invention. The methods and systems described herein may be applied to other types of storage media, such as those described above as well as others.

Figure 8:
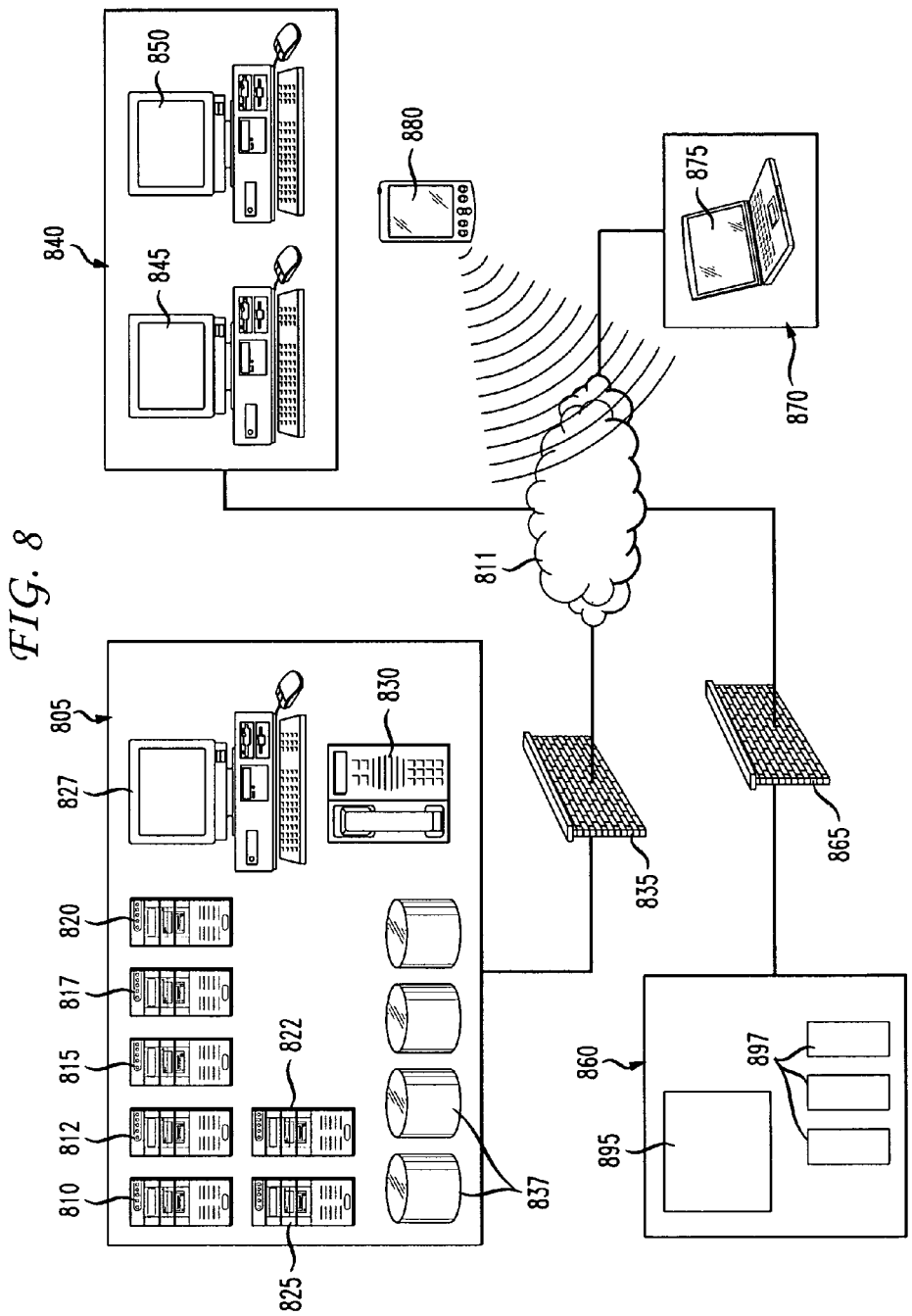
FIG. 8 is a block diagram illustrating a simplified gaming network topology for implementing certain aspects of the present invention.

One example of a network topology of a game provider network and for connections between the game provider and gaming operator for implementing some aspects of the present invention is shown in FIG. 8. Those of skill in the art will realize that this exemplary architecture and the related functionality are examples and that the present invention encompasses many other such embodiments and methods.

A simplified depiction of a gaming network for implementing certain features of the present invention is shown in FIG. 8. It will be appreciated that other types of networks involving different devices, more or fewer devices, etc., may be used to implement the present invention. For example, a game provider 805 may provide wagering games, but is not a gaming operator or establishment (such as a casino or the like) that provides on-site wagering games. However, in alternative implementations, game provider 805, may be, or may at least be associated with, such a gaming establishment.

In this example, game provider 805 provides services via one or more servers. In some implementations, the servers may be configured for specialized tasks. For example, server 810 may be primarily configured to provide authentication or identification functions, server 812 may be configured to create uniform storage medium or game disc identifiers and burning them onto discs. Server 815 may be primarily configured to store authentication server process 502, including code function 504, gaming machine data 506, and disc identifiers 508. Servers 817, 820, 825, and 827 may be primarily configured to provide various gaming services, for example, additional services such as advertising, network access, licensing, or game disc and gaming machine authorization functions, such as evaluating and providing authorization codes, as described above. However, tasks may be apportioned among devices in any convenient fashion. For instance, some or all servers could provide multiple services. In some such implementations, each blade of a blade server provides a separate functionality.

Telephone 830 allows direct verbal communication between personnel of game provider 805 and others, including gaming participants and gaming operators. Storage devices 837 allow storage of data, including but not limited to accounting and financial data, wager game play data, player data, analyses, game disc identification data, first and second authorization codes, etc. In some implementations of the invention, storage is provided at another location, e.g., via a storage network. Such storage may, for example, provide data mirroring or other types of redundancy. Preferably, redundant blades, servers and/or other devices provide failover protection. Firewall 835 is interposed between the devices of game provider 805 and Internet 811.

Gaming operator 860 is configured for communication with Internet 811 via firewall 865. Gaming operator 860 may be a casino, a cruise ship, a riverboat or any other type of gaming establishment. Shown at gaming operator 860 is a computer room 895 and gaming machines 897 which includes a writeable optical disc drive.

It will be appreciated that games could be played via devices other than those illustrated in FIG. 8 and that other devices not shown in FIG. 8, such as remote licensing server, may be used within the scope of the invention. Such devices include, but are not limited to, location detection devices and specialized optical disc drives.

Moreover, it will be appreciated that one or more networks other than Internet 811 may be used to implement various aspects of the invention, such as a satellite network, a wireless network, a metro optical transport, the PSTN, etc. Accordingly, a variety of protocols may be used for communication, such as Internet Protocol ("IP"), Fibre Channel ("FC"), FC over IP ("FCIP"), Internet SCSI ("iSCSI," an IP-based standard for linking data storage devices over a network and transferring data by carrying SCSI commands over IP networks), Dense Wavelength Division Multiplexing ("DWDM," an optical technology used to increase bandwidth over existing fiber optic backbones), or Code Division Multiple Access (CDMA, a wireless cellular communication technology).

Figure 9:
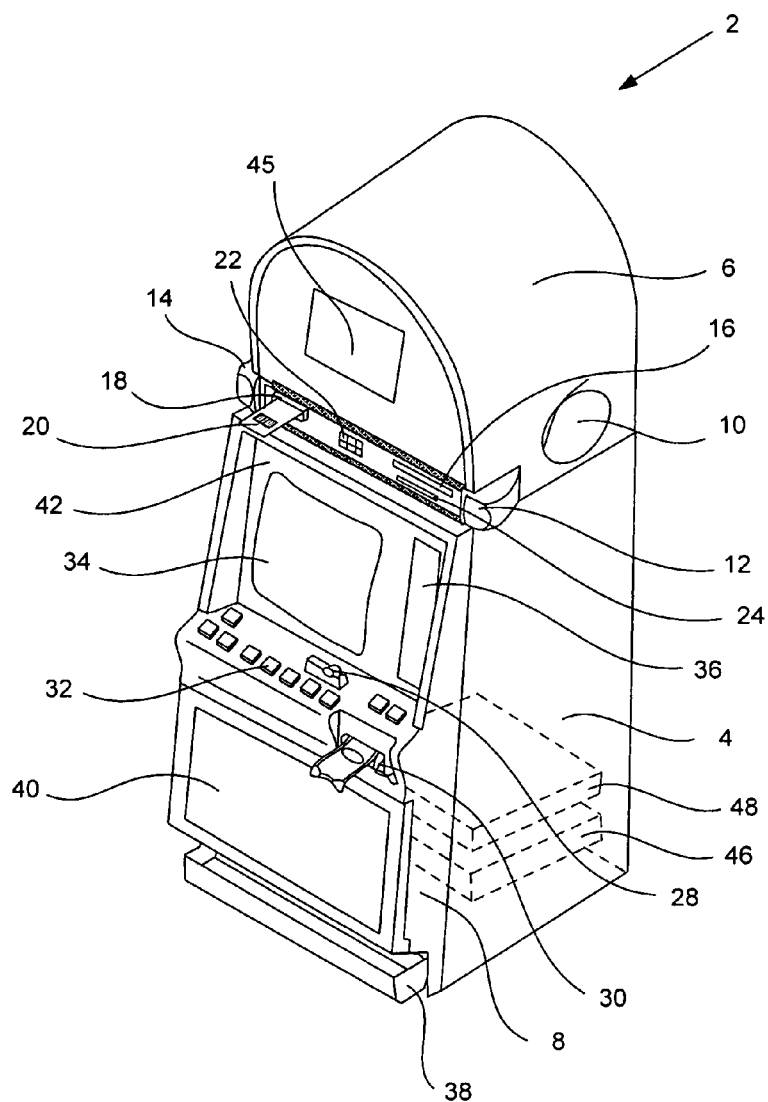
FIG. 9 is a perspective drawing of a free-standing gaming machine and its external components and features.

As illustrated in the example of FIG. 9, machine 2 includes a main cabinet 4, which generally surrounds the machine interior and is viewable by users. The main cabinet includes a main door 8 on the front of the machine, which opens to provide access to the interior of the machine.

In one embodiment, attached to the main door is at least one payment acceptor 28, a bill validator 30, and a coin tray 38. In one embodiment, the payment acceptor may include a coin slot and a payment, note or bill acceptor, where the player inserts money, coins or tokens. The player can place coins in the coin slot or paper money, a ticket or voucher into the payment, note or bill acceptor. In other embodiments, devices such as readers or validators for credit cards, debit cards or credit slips may accept payment. In one embodiment, a player may insert an identification card into a card reader of the gaming machine. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming machine. In one embodiment, money may be transferred to a gaming machine through electronic funds transfer. When a player funds the gaming machine, the master gaming controller 46 or another logic device coupled to the gaming machine determines the amount of funds entered and displays the corresponding amount on the credit or other suitable display as described above.

In one embodiment attached to the main door is a plurality of player-input switches or buttons 32. The input switches can include any suitable device which enables the player to produce an input signal which is received by the processor. In one embodiment, after appropriate funding of the gaming machine, the input switch is a game activation device, such as a pull arm or a play button which is used by the player to start any primary game or sequence of events in the gaming machine. The play button can be any suitable play activator such as a bet one button, a max bet button or a repeat the bet button. In one embodiment, upon appropriate funding, the gaming machine may begin the game play automatically. In another embodiment, upon the player engaging one of the play buttons, the gaming machine may automatically activate game play.

In one embodiment, one input switch is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input switch is a bet max button (not shown), which enables the player to bet the maximum wager permitted for a game of the gaming machine.

In one embodiment, one input switch is a cash-out button. The player may push the cash-out button and cash out to receive a cash payment or other suitable form of payment corresponding to the number of remaining credits. In one embodiment, when the player cashes out, the player may receive the coins or tokens in a coin payout tray. In one embodiment, when the player cashes out, the player may receive other payout mechanisms such as tickets or credit slips redeemable by a cashier (or other suitable redemption system) or funding to the player's electronically recordable identification card. Details of ticketing or voucher system that may be utilized with the present invention are described in co-pending U.S. patent application Ser. No. 10/406,911, filed Apr. 2, 2003, by Rowe, et al., and entitled, "Cashless Transaction Clearinghouse," which is incorporated herein by reference and for all purposes.

In one embodiment, one input switch is a touch-screen coupled with a touch-screen controller, or some other touch-sensitive display overlay to enable player interaction with the images on the display. The touch-screen and the touch-screen controller may be connected to a video controller. A player may make decisions and input signals into the gaming machine by touching the touch-screen at the appropriate places. One such input switch is a touch-screen button panel.

In one embodiment, the gaming machine may further include a plurality of communication ports for enabling communication of the gaming machine processor with external peripherals, such as external video sources, expansion buses, game or other displays, an SCSI port, a key pad, external optical disc drive, USB storage devices, and flash memory devices.

As seen in FIG. 9, viewable through the main door is a video display monitor 34 and an information panel 36. The display monitor 34 will typically be a cathode ray tube, high resolution flat-panel LCD, SED based-display, plasma display, a television display, a display based on light emitting diodes (LED) a display based on a plurality of organic light-emitting diodes (OLEDs), a display based on polymer light-emitting diodes (PLEDs), a display including a projected and/or reflected image or any other suitable electronic device or display. The information panel 36 or belly-glass 40 may be a static back-lit, silk screened glass panel with lettering to indicate general game information including, for example, a game denomination (e.g. $0.25 or $1) or a dynamic display, such as an LCD, an OLED or E-INK display. In another embodiment, at least one display device may be a mobile display device, such as a PDA or tablet PC, that enables play of at least a portion of the primary or secondary game at a location remote from the gaming machine. The display devices may be of any suitable size and configuration, such as a square, a rectangle, or an elongated rectangle.

The display devices of the gaming machine are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, and the like. In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one or a plurality of game or other suitable images, symbols or indicia. In another embodiment, the display device may include an electromechanical device adjacent to a video display, such as a video display positioned in front of a mechanical reel. In another embodiment, the display device may include dual layered video displays which co-act to generate one or more images.

The bill validator 30, player-input switches 32, video display monitor 34, and information panel are gaming devices that may be used to play a game on the game machine 2. According to a specific embodiment, the devices may be controlled by code executed by a master gaming controller 46 housed inside the main cabinet 4 of the machine 2. The master gaming controller may include one or more processors including general purpose and specialized processors, such as graphics cards, and one or more memory devices including volatile and non-volatile memory. It may also include a secure gaming machine ID chip. The master gaming controller 46 may periodically configure and/or authenticate the code executed on the gaming machine. Also housed inside the main cabinet 4 is an optical disc drive 48 that may be controlled by master gaming controller 46 or an appropriate driver or sub-processor. Optical disc drive 48 may be a read-only drive or a writeable drive, capable of recording data to a re-writeable disc, such as a DVD-RW or DVD+RW formatted disc. In other embodiments, disc drive 48 may be a specialized drive, such as a LightScribe-enabled drive. In another embodiment, disc drive 48 may have both normal DVD and optical disc capabilities and LightScribe capabilities, for example, by having two laser diodes, each operating on different sides of a disc.

In one embodiment, the gaming machine may include a sound generating device coupled to one or more sounds cards. In one embodiment, the sound generating device includes at least one and preferably a plurality of speakers or other sound generating hardware and/or software for generating sounds, such as playing music for the primary and/or secondary game or for other modes of the gaming machine, such as an attract mode. In one embodiment, the gaming machine provides dynamic sounds coupled with attractive multimedia images displayed on one or more of the display devices to provide an audio-visual representation or to otherwise display full-motion video with sound to attract players to the gaming machine. During idle periods, the gaming machine may display a sequence of audio and/or visual attraction messages to attract potential players to the gaming machine. The videos may also be customized for or to provide any appropriate information.

In one embodiment, the gaming machine may include a sensor, such as a camera that is selectively positioned to acquire an image of a player actively using the gaming machine and/or the surrounding area of the gaming machine. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

In another embodiment, the gaming devices on the gaming machine may be controlled by code executed by the master gaming controller 46 (or another logic device coupled to or in communication with the gaming machine, such as a player tracking controller) in conjunction with code executed by a remote logic device in communication with the master gaming controller 46. Master gaming controller may execute a function for generating the first authorization code. It may also perform the initial read of the game disc to determine if the disc already has a final authorization code.

Games Played

Many different types of games, including mechanical slot games, video slot games, video poker, video black jack, video pachinko and lottery, may be provided with gaming machines of this present invention. Game code for any of these and other games of chance may be stored on game discs and supplied to a gaming operator. A game disc may have more than one game. In particular, the gaming machine 2 may be operable to provide play of many different games of chance. The games may be differentiated according to themes, sounds, graphics, type of game (e.g., slot game vs. card game), denomination, number of paylines, maximum jackpot, progressive or non-progressive, bonus games, etc.

In one embodiment, the gaming machine 2 may be operable to enable a player to select a game of chance to play from a plurality of different games available on the gaming machine. For example, the gaming machine may provide a menu with a list of the different games that are available for play on the gaming machine and a player may be able to select from the list a first game of chance that they wish to play. In one such embodiment, a memory device of the remote host stores different game programs and instructions, executable by a gaming machine processor, to control the gaming machine. Each executable game program represents a different game or type of game, which may be played on one or more of the gaming machines in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming machine) or vice versa.

In one such embodiment, each gaming machine includes at least one or more display devices and/or one or more input switches for interaction with a player. A local processor, such as the above-described gaming machine processor or a processor of a local server, is operable with the display device(s) and/or the input switch(s) of one or more of the gaming machines. In operation, the remote host is operable to communicate one or more of the stored game programs to at least one local gaming machine processor. In different embodiments, the stored game programs are communicated or delivered to a gaming operator by embedding the communicated game program in a device or a component (e.g., a microchip to be inserted in a gaming machine), writing the game program on a disc or other media, downloading or streaming the game program over a dedicated data network, internet or a telephone line. In different embodiments, the stored game programs are downloaded in response to a player inserting a player tracking card, a player selecting a specific game program, a player inserting a designated wager amount, the remote host communicating data to the gaming device regarding an upcoming tournament or promotion or any other suitable trigger. After the stored game programs are communicated from the remote host, the local gaming machine processor executes the communicated program to facilitate play of the communicated program by a player through the display device(s) and/or input switch(s) of the gaming machine. That is, when a game program is communicated to a local gaming machine processor, the local gaming machine processor changes the game or type of game played at the gaming machine.

In one embodiment, the various games available for play on the gaming machine 2 may be stored as game software or code on a mass storage device in the gaming machine. In one such embodiment, a memory device of the gaming machine stores program codes and instructions, executable by the gaming machine processor, to control the games available for play on the gaming machine. The memory device may also store other data such as first and second authorization codes, gaming Gaming Machine vs. General-Purpose Computer Some preferred gaming machines of the present assignee are implemented with special features and/or additional circuitry that differentiates them from general-purpose computers (e.g., desktop PC's and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

For example, a watchdog timer is normally used in IGT gaming machines to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of the some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. Gaming machines of the present assignee typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT gaming machine game software is to use a state machine. Different functions of the game (bet, play, result, points in the graphical presentation, etc.) may be defined as a state. When a game moves from one state to another, critical data regarding the game software is stored in a custom non-volatile memory subsystem. This is critical to ensure the player's wager and credits are preserved and to minimize potential disputes in the event of a malfunction on the gaming machine.

In general, the gaming machine does not advance from a first state to a second state until critical information that enables the first state to be reconstructed is stored. This feature enables the game to recover operation to the current state of play in the event of a malfunction, loss of power, etc that occurred just prior to the malfunction. After the state of the gaming machine is restored during the play of a game of chance, game play may resume and the game may be completed in a manner that is no different than if the malfunction had not occurred. Typically, battery backed RAM devices are used to preserve this critical data although other types of non-volatile memory devices may be employed. These memory devices are not used in typical general-purpose computers.

As described in the preceding paragraph, when a malfunction occurs during a game of chance, the gaming machine may be restored to a state in the game of chance just prior to when the malfunction occurred. The restored state may include metering information and graphical information that was displayed on the gaming machine in the state prior to the malfunction. For example, when the malfunction occurs during the play of a card game after the cards have been dealt, the gaming machine may be restored with the cards that were previously displayed as part of the card game. As another example, a bonus game may be triggered during the play of a game of chance where a player is required to make a number of selections on a video display screen. When a malfunction has occurred after the player has made one or more selections, the gaming machine may be restored to a state that shows the graphical presentation at the just prior to the malfunction including an indication of selections that have already been made by the player. In general, the gaming machine may be restored to any state in a plurality of states that occur in the game of chance that occurs while the game of chance is played or to states that occur between the play of a game of chance.

Game history information regarding previous games played such as an amount wagered, the outcome of the game and so forth may also be stored in a non-volatile memory device. The information stored in the non-volatile memory may be detailed enough to reconstruct a portion of the graphical presentation that was previously presented on the gaming machine and the state of the gaming machine (e.g., credits) at the time the game of chance was played. The game history information may be utilized in the event of a dispute. For example, a player may decide that in a previous game of chance that they did not receive credit for an award that they believed they won. The game history information may be used to reconstruct the state of the gaming machine prior, during and/or after the disputed game to demonstrate whether the player was correct or not in their assertion. Further details of a state based gaming system, recovery from malfunctions and game history are described in U.S. Pat. No. 6,804,763, titled "High Performance Battery Backed RAM Interface", U.S. Pat. No. 6,863,608, titled "Frame Capture of Actual Game Play," U.S. application Ser. No. 10/243,104, titled, "Dynamic NV-RAM," and U.S. application Ser. No. 10/758, 828, titled, "Frame Capture of Actual Game Play," each of which is incorporated by reference and for all purposes.

Another feature of gaming machines, such as IGT gaming computers, is that they often include unique interfaces, including serial interfaces, to connect to specific subsystems internal and external to the gaming machine. The serial devices may have electrical interface requirements that differ from the "standard" EIA 232 serial interfaces provided by general-purpose computers. These interfaces may include EIA 485, EIA 422, Fiber Optic Serial, optically coupled serial interfaces, current loop style serial interfaces, etc. In addition, to conserve serial interfaces internally in the gaming machine, serial devices may be connected in a shared, daisy-chain fashion where multiple peripheral devices are connected to a single serial channel.

The serial interfaces may be used to transmit information using communication protocols that are unique to the gaming industry. For example, IGT's Netplex is a proprietary communication protocol used for serial communication between gaming devices. As another example, SAS is a communication protocol used to transmit information, such as metering information, from a gaming machine to a remote device. Often SAS is used in conjunction with a player tracking system.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into an IGT gaming machine by monitoring security switches attached to access doors in the gaming machine cabinet. Preferably, access violations result in suspension of game play and can trigger additional security operations to preserve the current state of game play. These circuits also function when power is off by use of a battery backup. In power-off operation, these circuits continue to monitor the access doors of the gaming machine. When power is restored, the gaming machine can determine whether any security violations occurred while power was off, e.g., via software for reading status registers. This can trigger event log entries and further data authentication operations by the gaming machine software.

Trusted memory devices and/or trusted memory sources are preferably included in an IGT gaming machine computer to ensure the authenticity of the software that may be stored on less secure memory subsystems, such as mass storage devices. Trusted memory devices and controlling circuitry are typically designed to not enable modification of the code and data stored in the memory device while the memory device is installed in the gaming machine. The code and data stored in these devices may include authentication algorithms, random number generators, authentication keys, operating system kernels, etc. The purpose of these trusted memory devices is to provide gaming regulatory authorities a root trusted authority within the computing environment of the gaming machine that can be tracked and verified as original. This may be accomplished via removal of the trusted memory device from the gaming machine computer and verification of the secure memory device contents is a separate third party verification device. Once the trusted memory device is verified as authentic, and based on the approval of the verification algorithms included in the trusted device, the gaming machine is enabled to verify the authenticity of additional code and data that may be located in the gaming computer assembly, such as code and data stored on hard disk drives. A few details related to trusted memory devices that may be used in the present invention are described in U.S. Pat. No. 6,685,567, titled "Process Verification," which is incorporated herein in its entirety and for all purposes.

In at least one embodiment, at least a portion of the trusted memory devices/sources may correspond to memory which cannot easily be altered (e.g., "unalterable memory") such as, for example, EPROMS, PROMS, Bios, Extended Bios, and/or other memory sources which are able to be configured, verified, and/or authenticated (e.g., for authenticity) in a secure and controlled manner.

According to a specific implementation, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment of the present invention, the remote device and the trusted information source may engage in methods using zero knowledge proofs to authenticate each of their respective identities.

Gaming devices storing trusted information may utilize apparatus or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

Additional details relating to trusted memory devices/sources are described in U.S. patent application Ser. No. 11/078,966, entitled "Secured Virtual Network in a Gaming Environment", naming Nguyen et al. as inventors, filed on Mar. 10, 2005, herein incorporated in its entirety and for all purposes.

Mass storage devices used in a general purpose computer typically enable code and data to be read from and written to the mass storage device. In a gaming machine environment, modification of the gaming code stored on a mass storage device is strictly controlled and would only be enabled under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present. Details using a mass storage device that may be used with the present invention are described, for example, in U.S. Pat. No. 6,149,522, herein incorporated by reference in its entirety and for all purposes.

Game Play

Returning to the example of FIG. 9, when a user wishes to play the gaming machine 2, he or she inserts a ticket or cash through the payment or coin acceptor 28 or bill validator 30. Additionally, the bill validator may accept a printed ticket voucher, which may be accepted by the bill validator 30 as an indicia of credit when a cashless ticketing system is used. At the start of the game, the player may enter playing tracking information using the card reader 24, the keypad 22, and the florescent display 16. Further, other game preferences of the player playing the game may be read from a card inserted into the card reader. During the game, the player views game information using the video display 34. Other game and prize information may also be displayed in the video display screen 45 located in the top box.

During the course of a game, a player may be required to make a number of decisions, which affect the outcome of the game. For example, a player may vary his or her wager on a particular game, select a prize for a particular game selected from a prize server, or make game decisions which affect the outcome of a particular game. The player may make these choices using the player-input switches 32, the video display screen 34 or using some other device which enables a player to input information into the gaming machine. In some embodiments, the player may be able to access various game services such as concierge services and entertainment content services using the video display screen 34 and one more input devices.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights behind the belly glass 40. After the player has completed a game, the player may receive game tokens from the coin tray 38 or the ticket 20 from the printer 18, which may be used for further games or to redeem a prize. Further, the player may receive a ticket 20 for food, merchandise, or games from the printer 18.

In one embodiment, as described above, the gaming machine can incorporate any suitable wagering primary or base game. The gaming machine or device may include some or all of the features of conventional gaming machines or devices. The primary or base game may comprise any suitable reel-type game, card game, cascading or falling symbol game, number game or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, a base or primary game may be a slot game with one or more paylines. The paylines may be horizontal, vertical, circular, diagonal, angled or any combination thereof. In this embodiment, the gaming machine includes at least one and preferably a plurality of reels, such as three to five reels, in either electromechanical form with mechanical rotating reels or video form with simulated reels and movement thereof. In one embodiment, an electromechanical slot machine includes a plurality of adjacent, rotatable reels, which may be combined and operably coupled with an electronic display of any suitable type. In another embodiment, if the reels are in video form, one or more of the display devices, as described above, display the plurality of simulated video reels. Each reel displays a plurality of indicia or symbols, such as bells, hearts, fruits, numbers, letters, bars or other images, which preferably correspond to a theme associated with the gaming machine. In another embodiment, one or more of the reels are independent reels or unisymbol reels. In this embodiment, each independent or unisymbol reel generates and displays one symbol to the player. In one embodiment, the gaming machine awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming machine determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming machine provides the player one award for that occurrence of the generated winning symbol combination. For example, if one winning symbol combination is generated on the reels, the gaming machine will provide a single award to the player for that winning symbol combination (i.e., not based on paylines that would have passed through that winning symbol combination). It should be appreciated that because a gaming machine with wagering on ways to win provides the player one award for a single occurrence of a winning symbol combination and a gaming machine with paylines may provide the player more than one award for the same occurrence of a single winning symbol combination (i.e., if a plurality of paylines each pass through the same winning symbol combination), it is possible to provide a player at a ways to win gaming machine more ways to win for an equivalent bet or wager on a traditional slot gaming machine with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming machine with at least one symbol generated in an active symbol position. For example, a three reel gaming machine with three symbols generated in active symbol positions on each reel includes 27 ways to win (i.e., 3 symbols on the first reel×3 symbols on the second reel×3 symbols on the third reel). A four reel gaming machine with three symbols generated in active symbol positions on each reel includes 81 ways to win (i.e., 3 symbols on the first reel×3 symbols on the second reel×3 symbols on the third reel×3 symbols on the fourth reel). A five reel gaming machine with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels, modifies the number of ways to win.

In another embodiment, the gaming machine may enable a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more or each of the reels and the processor of the gaming machine uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming machine provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming machine provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming machine individually determines if a symbol generated in an active symbol position on a first reel forms part of a winning symbol combination with or is otherwise suitably related to a symbol generated in an active symbol position on a second reel. In this embodiment, the gaming machine classifies each pair of symbols, which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming machine classifies the two cherry symbols as a string of related symbols because the two cherry symbols form part of a winning symbol combination.

After determining if any strings of related symbols are formed between the symbols on the first reel and the symbols on the second reel, the gaming machine determines if any of the symbols from the next adjacent reel should be added to any of the formed strings of related symbols. In this embodiment, for a first of the classified strings of related symbols, the gaming machine determines if any of the symbols generated by the next adjacent reel form part of a winning symbol combination or are otherwise related to the symbols of the first string of related symbols. If the gaming machine determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming machine adds the related cherry symbol generated on the third reel to the previously classified string of cherry symbols.

On the other hand, if the gaming machine determines that no symbols generated on the next adjacent reel are related to the symbols of the first string of related symbols, the gaming machine marks or flags such string of related symbols as complete. For example, if the first string of related symbols is the string of related cherry symbols and none of the symbols of the third reel are related to the cherry symbols of the previously classified string of cherry symbols, the gaming machine marks or flags the string of cherry symbols as complete.

After either adding a related symbol to the first string of related symbols or marking the first string of related symbols as complete, the gaming machine proceeds as described above for each of the remaining classified strings of related symbols which were previously classified or formed from related symbols on the first and second reels.

After analyzing each of the remaining strings of related symbols, the gaming machine determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming machine marks each of the remaining pending strings of related symbols as complete.

When each of the strings of related symbols is marked complete, the gaming machine compares each of the strings of related symbols to an appropriate paytable and provides the player any award associated with each of the completed strings of symbols. It should be appreciated that the player is provided one award, if any, for each string of related symbols generated in active symbol positions (i.e., as opposed to being based on how many paylines that would have passed through each of the strings of related symbols in active symbol positions).

In one embodiment, a base or primary game may be a poker game wherein the gaming machine enables the player to play a conventional game of video draw poker and initially deals five cards all face up from a virtual deck of fifty-two card deck. Cards may be dealt as in a traditional game of cards or in the case of the gaming machine, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming machine compares the final five-card hand to a payout table which utilizes conventional poker hand rankings to determine the winning hands. The gaming machine provides the player with an award based on a winning hand and the credits the player wagered.

In another embodiment, the base or primary game may be a multi-hand version of video poker. In this embodiment, the gaming machine deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming machine displays a plurality of selectable indicia or numbers on at least one of the display devices. In this embodiment, the player selects at least one or a plurality of the selectable indicia or numbers via an input device such as the touch screen. The gaming machine then displays a series of drawn numbers to determine an amount of matches, if any, between the player's selected numbers and the gaming machine's drawn numbers. The player is provided an award based on the amount of matches, if any, based on the amount of determined matches.

In one embodiment, in addition to winning credits or other awards in a base or primary game, as described above, the gaming machine may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game. In other embodiments, the triggering event or qualifying condition may be by exceeding a certain amount of game play (such as number of games, number of credits, amount of time), or reaching a specified number of points earned during game play.

In another embodiment, the gaming machine processor or remote host randomly provides the player one or more plays of one or more secondary games. In one such embodiment, the gaming machine does not provide any apparent reasons to the player for qualifying to play a secondary or bonus game. In this embodiment, qualifying for a bonus game is not triggered by an event in or based specifically on any of the plays of any primary game. That is, the gaming machine may simply qualify a player to play a secondary game without any explanation or alternatively with simple explanations. In another embodiment, the gaming machine (or remote host) qualifies a player for a secondary game at least partially based on a game triggered or symbol triggered event, such as at least partially based on the play of a primary game.

In one embodiment, the gaming machine includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game is accomplished through a simple "buy in" by the player, for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Gaming System Components

Figure 10:
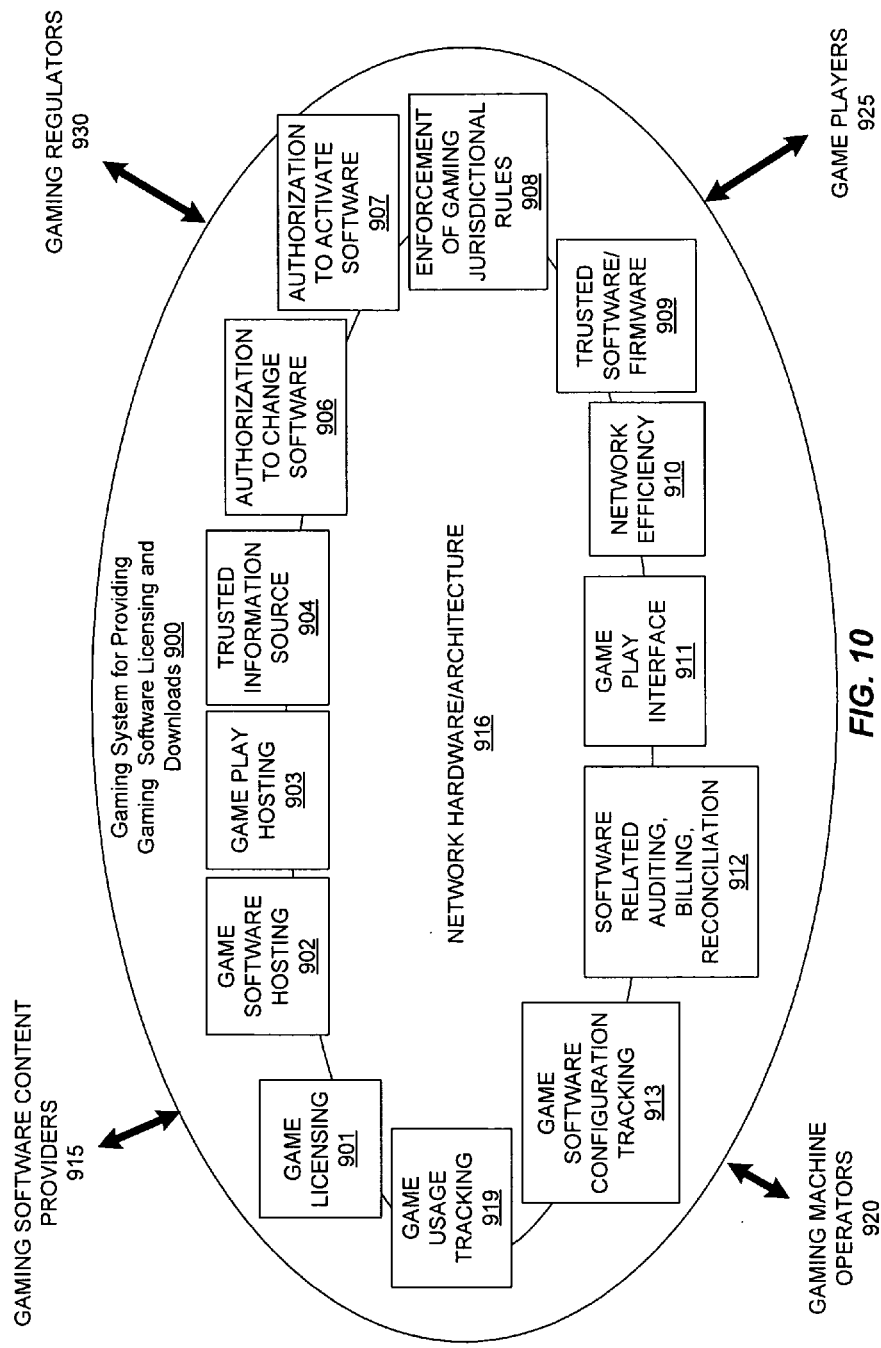
FIG. 10 shows a block diagram illustrating components of a gaming system 900 which may be used for implementing various aspects of the present invention.

FIG. 10 shows a block diagram illustrating components of a gaming system 900 which may be used for implementing various aspects of the present invention. In FIG. 10, the components of a wager gaming system 900 for providing game software licensing and downloads are described functionally. The described functions may be instantiated in hardware, firmware and/or software and executed on a suitable device. In the system 900, there may be many instances of the same function, such as multiple game play interfaces 911. Nevertheless, in FIG. 10, only one instance of each function is shown. The functions of the components may be combined. For example, a single device may comprise the game play interface 911 and include trusted memory devices or sources 909. The described components and their functions may be incorporated in various embodiments of the servers and clients described with respect to at least FIG. 10.

The gaming system 900 may receive inputs from different groups/entities and output various services and or information to these groups/entities. For example, game players 925 primarily input cash or indicia of credit into the system, make game selections that trigger software downloads, and receive entertainment in exchange for their inputs. Game software content providers 915 provide game software for the system and may receive compensation for the content they provide based on licensing agreements with the gaming operators. Gaming operators 920 select game software for distribution, distribute the game software on the gaming devices in the system 900, receive revenue for the use of their software and compensate the game providers 915. The gaming regulators 930 may provide rules and regulations that must be applied to the gaming system and may receive reports and other information confirming that rules are being obeyed.

In the following paragraphs, details of each component and some of the interactions between the components are described with respect to FIG. 10. The game software license host 901 may be a server connected to a number of remote gaming devices that provides licensing services to the remote gaming devices. For example, in other embodiments, the license host 901 may 1) receive token requests for tokens used to activate software executed on the remote gaming devices, 2) send tokens to the remote gaming devices, 3) track token usage and 4) grant and/or renew software licenses for software executed on the remote gaming devices. The token usage may be used in utility based licensing schemes, such as a pay-per-use scheme.

In another embodiment, a game usage-tracking host 919 may track the usage of game software on a plurality of devices in communication with the host. The game usage-tracking host 919 may be in communication with a plurality of game play hosts and gaming machines. From the game play hosts and gaming machines, the game usage tracking host 919 may receive updates of an amount that each game available for play on the devices has been played and on amount that has been wagered per game. This information may be stored in a database and used for billing according to methods described in a utility based licensing agreement.

The game software host 902 may provide game software downloads, such as downloads of game software or game firmware, to various devices in the game system 900. For example, when the software to generate the game is not available on the game play interface 911, the game software host 902 may download software to generate a selected game of chance played on the game play interface. Further, the game software host 902 may download new game content to a plurality of gaming machines via a request from a gaming machine operator.

In one embodiment, the game software host 902 may also be a game software configuration-tracking host 913. The function of the game software configuration-tracking host is to keep records of software configurations and/or hardware configurations for a plurality of devices in communication with the host (e.g., denominations, number of paylines, paytables, max/min bets). Details of a game software host and a game software configuration host that may be used with the present invention are described in co-pending U.S. Pat. No. 6,645,077, by Rowe, entitled, "Gaming Terminal Data Repository and Information System," filed Dec. 21, 2000, which is incorporated herein in its entirety and for all purposes.

A game play host device 903 may be a host server connected to a plurality of remote clients that generates games of chance that are displayed on a plurality of remote game play interfaces 911. For example, the game play host device 903 may be a server that provides central determination for a bingo game play played on a plurality of connected game play interfaces 911. As another example, the game play host device 903 may generate games of chance, such as slot games or video card games, for display on a remote client. A game player using the remote client may be able to select from a number of games that are provided on the client by the host device 903. The game play host device 903 may receive game software management services, such as receiving downloads of new game software, from the game software host 902 and may receive game software licensing services, such as the granting or renewing of software licenses for software executed on the device 903, from the game license host 901.

In particular embodiments, the game play interfaces or other gaming devices in the gaming system 900 may be portable devices, such as electronic tokens, cell phones, smart cards, tablet PC's and PDA's. The portable devices may support wireless communications and thus, may be referred to as wireless mobile devices. The network hardware architecture 916 may be enabled to support communications between wireless mobile devices and other gaming devices in gaming system. In one embodiment, the wireless mobile devices may be used to play games of chance.

The gaming system 900 may use a number of trusted information sources. Trusted information sources 904 may be devices, such as servers, that provide information used to authenticate/activate other pieces of information, authorization codes to certify game discs and authorize game software on a gaming machine, CRC values used to authenticate software, license tokens used to enable the use of software and product activation codes used to activate to software are examples of trusted information that might be provided from a trusted information source 904. Trusted information sources may be a memory device, such as an EPROM, that includes trusted information used to authenticate other information or functions for generating authorization codes. For example, a game play interface 911 may store a private encryption key in a trusted memory device that is used in a private key-public key encryption scheme to authenticate information from another gaming device.

When a trusted information source 904 is in communication with a remote device via a network, the remote device will employ a verification scheme to verify the identity of the trusted information source. For example, the trusted information source and the remote device may exchange information using public and private encryption keys to verify each other's identities.

Gaming devices storing trusted information might utilize apparatus or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

The gaming system 900 of the present invention may include devices 906 that provide authorization to download software from a first device to a second device and devices 907 that provide activation codes or information that enable downloaded software to be activated. The devices, 906 and 907, may be remote servers and may also be trusted information sources. One example of a method of providing product activation codes that may be used with the present invention is describes in previously incorporated U.S. Pat. No. 6,264,561.

A device 906 that monitors a plurality of gaming devices to determine adherence of the devices to gaming jurisdictional rules 908 may be included in the system 900. In one embodiment, a gaming jurisdictional rule server may scan software and the configurations of the software on a number of gaming devices in communication with the gaming rule server to determine whether the software on the gaming devices is valid for use in the gaming jurisdiction where the gaming device is located. For example, the gaming rule server may request a digital signature, such as CRC's, of particular software components and compare them with an approved digital signature value stored on the gaming jurisdictional rule server.

Further, the gaming jurisdictional rule server may scan the remote gaming device to determine whether the software is configured in a manner that is acceptable to the gaming jurisdiction where the gaming device is located. For example, a maximum bet limit may vary from jurisdiction to jurisdiction and the rule enforcement server may scan a gaming device to determine its current software configuration and its location and then compare the configuration on the gaming device with approved parameters for its location.

A gaming jurisdiction may include rules that describe how game software may be downloaded and licensed. The gaming jurisdictional rule server may scan download transaction records and licensing records on a gaming device to determine whether the download and licensing was carried out in a manner that is acceptable to the gaming jurisdiction in which the gaming device is located. In general, the game jurisdictional rule server may be utilized to confirm compliance to any gaming rules passed by a gaming jurisdiction when the information needed to determine rule compliance is remotely accessible to the server.

Game software, firmware or hardware residing at a particular gaming device may also be used to check for compliance with local gaming jurisdictional rules. In one embodiment, when a gaming device is installed in a particular gaming jurisdiction, a software program including jurisdiction rule information may be downloaded to a secure memory location on a gaming machine or the jurisdiction rule information may be downloaded as data and utilized by a program on the gaming machine. The software program and/or jurisdiction rule information may used to check the gaming device software and software configurations for compliance with local gaming jurisdictional rules. In another embodiment, the software program for ensuring compliance and jurisdictional information may be installed in the gaming machine prior to its shipping, such as at the factory where the gaming machine is manufactured.

The gaming devices in game system 900 may utilize trusted software and/or trusted firmware. Trusted firmware/software is trusted in the sense that is used with the assumption that it has not been tampered with. For instance, trusted software/firmware may be used to authenticate other game software or processes executing on a gaming device. As an example, trusted encryption programs and authentication programs may be stored on an EPROM on the gaming machine or encoded into a specialized encryption chip. As another example, trusted game software, i.e., game software approved for use on gaming devices by a local gaming jurisdiction may be required on gaming devices on the gaming machine.

In the present invention, the devices may be connected by a network 916 with different types of hardware using different hardware architectures. Game software can be quite large and frequent downloads can place a significant burden on a network, which may slow information transfer speeds on the network. For game-on-demand services that require frequent downloads of game software in a network, efficient downloading is essential for the service to remain viable. Thus, in the various embodiments, network efficiency devices 910 may be used to actively monitor and maintain network efficiency. For instance, software locators may be used to locate nearby locations of game software for peer-to-peer transfers of game software. In another example, network traffic may be monitored and downloads may be actively rerouted to maintain network efficiency.

One or more devices in the present invention may provide game software and game licensing related auditing, billing and reconciliation reports to server 912. For example, a software licensing billing server may generate a bill for a gaming operator based upon a usage of games over a time period on the gaming devices owned by the operator. In another example, a software auditing server may provide reports on game software downloads to various gaming devices in the gaming system 900 and current configurations of the game software on these gaming devices.

At particular time intervals, the software auditing server 912 may also request software configurations from a number of gaming devices in the gaming system. The server may then reconcile the software configuration on each gaming device. In one embodiment, the software auditing server 912 may store a record of software configurations on each gaming device at particular times and a record of software download transactions that have occurred on the device. By applying each of the recorded game software download transactions since a selected time to the software configuration recorded at the selected time, a software configuration is obtained. The software auditing server may compare the software configuration derived from applying these transactions on a gaming device with a current software configuration obtained from the gaming device. After the comparison, the software-auditing server may generate a reconciliation report that confirms that the download transaction records are consistent with the current software configuration on the device. The report may also identify any inconsistencies. In another embodiment, both the gaming device and the software auditing server may store a record of the download transactions that have occurred on the gaming device and the software auditing server may reconcile these records.

There are many possible interactions between the components described with respect to FIG. 10. Many of the interactions are coupled. For example, methods used for game licensing may affect methods used for game downloading and vice versa. For the purposes of explanation, details of a few possible interactions between the components of the system 900 relating to software licensing and software downloads have been described. The descriptions are selected to illustrate particular interactions in the game system 900. These descriptions are provided for the purposes of explanation only and are not intended to limit the scope of the present invention.

The above-described devices and materials will be familiar to those of skill in the computer hardware and software arts. Although many of the components and processes are described above in the singular for convenience, it will be appreciated by one of skill in the art that multiple components and repeated processes can also be used to practice the techniques of the present invention.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the embodiments described are to be considered as illustrative and not restrictive, and the invention is not to be limited to the details given herein, but may be modified within the scope and equivalents of the appended claims.

We claim:

1. A method of operating a gaming system, the method comprising:
   (a) accessing, by one of a plurality of gaming machines, a portable storage medium;
   (b) determining, at a controller of said one of the plurality of gaming machines, whether any final authorization code has been written to the portable storage medium and whether any final authorization code has been written to a memory of said one of the plurality of gaming machines;
   (c) when different final authorization codes have been written to the portable storage medium and to the memory of said one of the plurality of gaming machines, preventing said one of the plurality of gaming machines from executing wager gaming software stored on the portable storage medium;
   (d) when final authorization codes have not been written to the portable storage medium or to the memory of said one of the gaming machines:
      (i) preventing said one of the plurality of gaming machines from executing wager gaming software stored on the portable storage medium;
      (ii) generating, at the controller of said one of the plurality of gaming machines, a first authorization code using data stored on the portable storage medium;
      (iii) transmitting, by said one of the plurality of gaming machines, the first authorization code to an authorization server;
      (iv) receiving, at said one of the plurality of gaming machines, a final authorization code from the authorization server; and
      (v) writing, by said one of the plurality of gaming machines, the final authorization code to both (A) the portable storage medium and (B) a memory of said one of the plurality of gaming machines; and
   (e) when the same final authorization code has been written to both the portable storage medium and the memory of said one of the plurality of gaming machines, enabling said one of the plurality of gaming machines to execute the wager gaming software stored on the portable storage medium.

2. The method of claim 1 wherein generating the first authorization code further comprises generating the first authorization code using gaming machine data.

3. The method of claim 1 wherein the data stored on the portable storage medium includes a portable storage medium unique identifier.

4. The method of claim 1 wherein generating the first authorization code further comprises generating the first authorization code by executing a first authorization code function.

5. The method of claim 4 wherein executing the first authorization code function further comprises executing the first authorization code function by inputting the data stored on the portable storage medium and gaming machine data.

6. The method of claim 1 wherein the memory of said one of the plurality of gaming machines is a non-volatile memory and further comprising saving the first authorization code to the non-volatile memory of said one of the plurality of gaming machines.

7. The method of claim 1 wherein transmitting the first authorization code further comprises transmitting the first authorization code over a network connection with the authorization server.

8. The method of claim 1 wherein transmitting the first authorization code further comprises transmitting the first authorization code by verbally communicating the first authorization code to the authorization server.

9. The method of claim 1 further comprising:
   transmitting, by said one of the plurality of gaming machines, gaming machine data and gaming operator data to the authorization server.

10. The method of claim 1 wherein the memory of said one of the plurality of gaming machines is a non-volatile memory.

11. The method of claim 1 wherein the portable storage medium is one selected from a group consisting of: an optical disc, a magnetic storage, and a flash memory.

12. The method of claim 1 wherein the final authorization code is generated by the authorization server based at least in part on the first authorization code.

* * * * *